J. T. SHOAF.
MOTOR VEHICLE WHEEL HUB.
APPLICATION FILED JUNE 28, 1915.
1,215,208.
Patented Feb. 6, 1917.
2 SHEETS—SHEET 1.
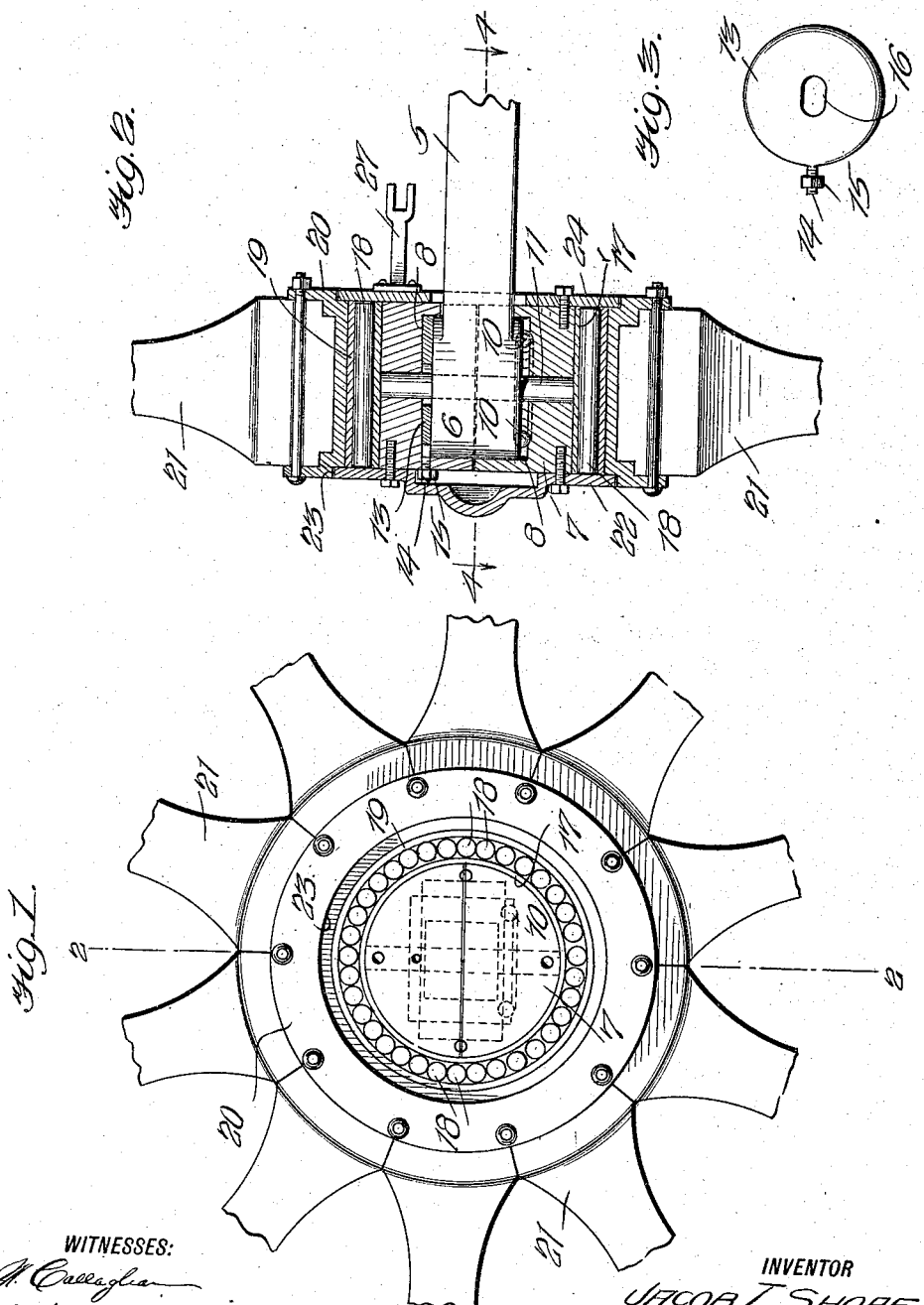
WITNESSES:
INVENTOR
JACOB T. SHOAF,
BY Munn & Co.
ATTORNEYS J. T. SHOAF.
MOTOR VEHICLE WHEEL HUB.
APPLICATION FILED JUNE 28, 1915.
1,215,208.
Patented Feb. 6, 1917.
2 SHEETS—SHEET 2.
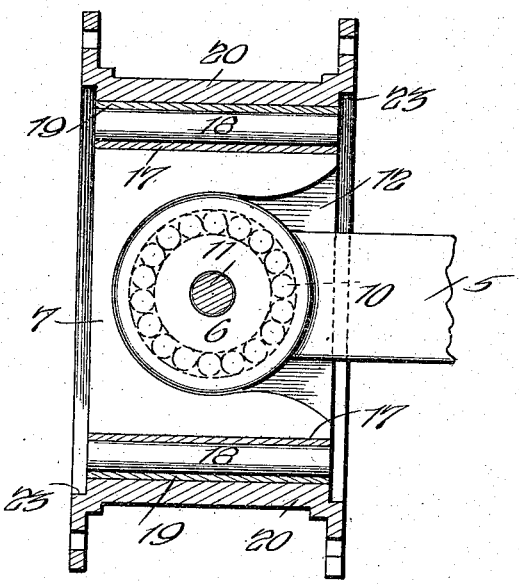
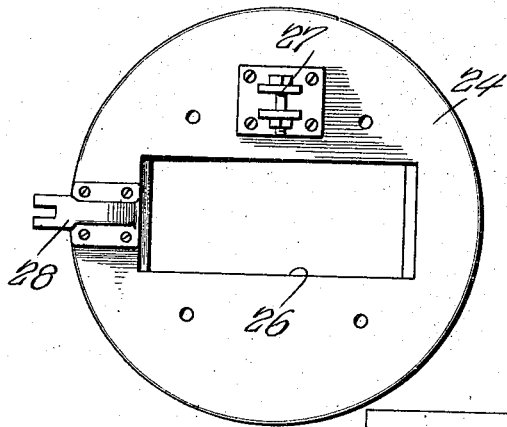
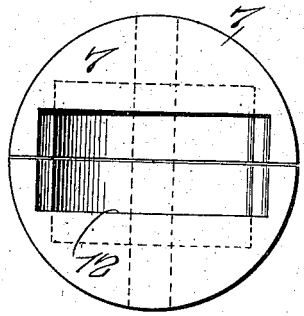
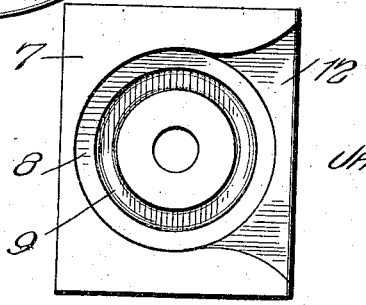
WITNESSES:
INVENTOR
JACOB T. SHOAF,
BY Munn & Co.
ATTORNEYS

UNITED STATES PATENT OFFICE.

JACOB TURNER SHOAF, OF EUREKA, CALIFORNIA.

MOTOR-VEHICLE-WHEEL HUB.

1,215,208.

Specification of Letters Patent.

Patented Feb. 6, 1917.

Application filed June 28, 1915. Serial No. 36,688.

*To all whom it may concern:*

Be it known that I, JACOB T. SHOAF, a citizen of the United States, and a resident of Eureka, in the county of Humboldt and State of California, have invented certain new and useful Improvements in Motor-Vehicle-Wheel Hubs, of which the following is a specification.

This invention relates to an improvement in motor vehicle wheel hubs, and one of the principal objects of the invention is to provide a wheel hub of such nature that the wheel is suspended or supported upon the axle at a point occurring in the center of the wheel so that strain upon the wheel will be equalized and will not be unequally distributed as is the case in wheels of the type carried by steering knuckles, brackets, and the like.

Another object of the invention is to provide a wheel hub of the class described in the nature of a non-rotatable bearing arranged in a vertical plane and pivoted for horizontal movement upon the axle end, the bearing forming a journal upon which the wheel is adapted to rotate.

A still further object of the invention is to provide a device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures of which—

Figure 1 represents a view in elevation of a hub constructed according to my invention, the outer hub plate being removed to reveal the interior structure.

Fig. 2 represents a vertical central transverse sectional view taken through the hub on the plane indicated by the line 2—2 of Fig. 1.

Fig. 3 represents a view in elevation of the wedge for taking up wear.

Fig. 4 represents a view in section taken horizontally on the plane indicated by the line 4—4 of Fig. 2, looking in the direction indicated by the arrows.

Fig. 5 represents a view in elevation of the inner hub plate.

Fig. 6 represents an inside elevational view of the hub bearing removed.

Fig. 7 represents a plan view of one of the members forming the hub bearing.

Referring more particularly to the drawings, a vehicle axle is indicated at 5 and is provided at its end with a horizontally arranged substantially annular enlargement or bearing 6. The hub bearing 7 is adapted to inclose the enlargement 6 and is composed of two similarly formed members of equal size adapted to be connected together face to face when in place upon the enlargement 6. Each of the members forming the hub bearing is substantially semi-circular in shape and is provided with a central recess 8 into which one of the faces of the enlargement 6 is adapted to extend as indicated in Fig. 2. The lower member forming the hub bearing is provided as indicated in Fig. 7 with an annular raceway 9 for the reception of bearing balls 10, a similar raceway being provided in the lower face of the enlargement 6, between which enlargement and lower hub member, the bearing balls 10 are arranged in the manner shown. When the hub bearing is in place on the enlargement 6, it is disposed in a vertical plane and is of a circular shape as indicated in Fig. 6. A vertically extending pivot pin 11 is passed through alining openings in the hub bearing and the enlargement 6, and acts as a pivot upon which the hub bearing may turn in a horizontal plane. The pin may be dispensed with if desired. In its inner face the hub bearing is provided with an opening 12 which extends from the interior opening formed in the hub bearing to the surface of said bearing, and through this opening 12 the axle 5 extends. The opening is substantially bell-shaped as indicated in Fig. 4, so that the entire bearing may oscillate in its horizontal plane relatively to the axle. In order that wear between the hub bearing and the enlargement 6 may be taken up, I have provided a circular wedge 13 which is disposed between the upper face of enlargement 6 and the upper member of the hub bearing, said wedge being provided with a threaded lug 14 which extends through an opening in the upper member of the hub bearing and is equipped with a nut 15 whereby the wedge may be adjusted laterally with respect to the hub bearing, as will be readily understood. The wedge is provided with an elongated opening 16 through which the pin 17 extends.

After the hub bearing has been disposed in place, a metallic sleeve of suitable nature indicated at 17 is driven onto the bearing for maintaining the members thereof against separation. This sleeve 17 forms the floor of a raceway in which the rollers 18 are arranged, the opposite member of the raceway being in the nature of a sleeve 19 carried internally of the spoke ring 20 to which the spokes 21 are attached in the usual way. By this arrangement it will be seen that the body portion of the wheel may revolve about the hub bearing as a center.

Disposed upon the outer face of the hub is the outer hub plate 22. This plate is connected by means of screws or other detachable elements with the members of the hub bearing. The outer edge of the hub plate extends within an annular rabbet 23 formed in the spoke ring 20, so that the bearings 18 and internal parts of the hub may be securely protected against dust and other foreign substances. Upon the inner face of the hub is disposed an inner hub plate 24 of substantially similar construction to plate 22 and which also at its outer edge extends into an annular rabbet formed in the spoke ring. The inner hub plate is also connected by means of suitable detachable elements with the hub bearing. This inner plate is provided as indicated in Fig. 5 with a central slot or elongated opening 26 which registers with the outer portion of the bell-shaped opening 12 provided in the hub bearing, so that interference of the inner hub plate 24 with the oscillatory movement of the hub bearing relatively to the axle, will not be experienced. It will be noted that since the upper and lower surfaces of the enlargement or bearing 6 extend into the recesses provided centrally in the members of the hub bearing, dust and other foreign substances will be prevented from entering between the faces of the enlargement or bearing 6 and the adjacent portions of the hub. Extending from the inner hub plate 24 at a point above axle 5, is a lug or bracket 27 to which may be connected a link controlled by the steering post, so that the wheel may be rotated upon its vertical axis in guiding the machine. Arranged adjacent the forward edge of the inner hub plate and in front of the axle, is a second bracket or knuckle 28 with which one end of the reach or rod extending between the guide wheels of the vehicle, is connected.

It will be noted that the wheel is journaled at its center and that all the strain imparted to the wheel will be transmitted through the central portion thereof and equally distributed throughout the wheel.

Although I have described the preferred embodiment of my invention, I may desire to make such changes in the construction, combination, and arrangement of parts as do not depart from the spirit of the invention and the scope of the appended claims.

Such a hub as I have provided will render a vehicle to which it is applied extremely easy to steer and introduces an element of safety in the operation of the machine, since there is less likelihood of an automobile equipped with the hubs according to my invention jumping off of the road upon striking obstacles, than there is of a machine equipped with hubs of the ordinary conventional type.

I claim:—

1. In a device of the class described, the combination of an axle having an annular horizontally arranged enlargement at one end, a vertically arranged annular hub bearing provided centrally with an opening into which said enlargement extends, the upper and lower faces of the enlargement extending into the upper and lower portions of the opening beyond the adjacent faces of the axle, said hub bearing being further provided with a bell-shaped opening communicating with the first said opening and through which the axle extends, anti-friction bearings arranged between the lower surface of the enlargement and the adjacent surface of the hub bearing, a wedge arranged between the upper surface of the enlargement and the adjacent surface of the hub bearing, a sleeve encircling said bearing, a spoke ring encircling the sleeve in spaced relation thereto and being provided with a second sleeve, a plurality of rollers arranged between the sleeves, an outer hub plate fixedly connected with the hub bearing and extending at its outer edges into an annular rabbet formed in the spoke ring, an inner hub plate fixedly connected with the hub bearing and likewise extending at its outer edge into an annular rabbet provided in the spoke ring, said inner hub plate being provided with an elongated opening registering with said bell-shaped opening, and knuckles carried by the inner hub plate one above the axle and one in advance of the same, and adapted to be connected respectively with a steering post operated link and with a reach rod.

2. A device of the class described, including an axle, a hub bearing surrounding the axle at one end, a pin pivotally connecting the hub bearing and the axle end, a wedge surrounding the pin and arranged between the hub bearing and axle end and having means extending through an opening in the hub bearing whereby the wedge may be adjusted, and a cap carried by the hub bearing and overlying the said means.

3. A device of the class described including an axle having an enlargement, a hub bearing surrounding the enlargement, a pin pivotally connecting the hub bearing and enlargement, a wedge arranged between the hub bearing and enlargement and having a slot through which the pin extends and being provided with a lug extending through an opening in the hub bearing, and means carried by the lug without the hub bearing whereby the wedge may be shifted relatively to the hub bearing and enlargement for taking up wear between them.

JACOB TURNER SHOAF.

Witnesses:
OLCOTT CUMMINS,
R. J. ROGERS.

Copies of this patent may be obtained for five cents each, by addressing the "Commissioner of Patents, Washington, D. C."